United States Patent [19]

Seibold et al.

[11] 4,340,236
[45] Jul. 20, 1982

[54] PULLABLE GOLF CLUB RECEPTACLE

[76] Inventors: Paul F. Seibold, 1760 N. Woodward, Bloomfield Hills, Mich. 48013; Alfred H. Haberstump, 400 Southfield, Birmingham, Mich. 48009

[21] Appl. No.: 34,282

[22] Filed: Apr. 30, 1979

[51] Int. Cl.³ .............................................. B62B 1/12
[52] U.S. Cl. .................................... 280/38; 280/645; 280/652; 280/655; 280/DIG. 6
[58] Field of Search ................ 280/DIG. 6, 646, 645, 280/40, 42, 651, 652, 655, 639, 38, 641; 403/900, 102

[56] References Cited

U.S. PATENT DOCUMENTS

| 2,518,803 | 8/1950 | Marvin | 280/40 |
| 2,538,374 | 1/1951 | May | 280/645 |
| 2,714,012 | 7/1955 | Berger | 280/40 |
| 2,770,466 | 11/1956 | Pearson et al. | 280/646 |
| 2,899,212 | 8/1959 | Mayer | 280/38 |
| 3,051,505 | 8/1962 | Flanagan | 280/DIG. 6 |

FOREIGN PATENT DOCUMENTS

| 824697 | 12/1959 | United Kingdom | 280/DIG. 6 |
| 1376435 | 12/1974 | United Kingdom | 280/652 |

Primary Examiner—Randolph A. Reese
Assistant Examiner—Milton L. Smith
Attorney, Agent, or Firm—Harness, Dickey & Pierce

[57] ABSTRACT

A pullable golf club receptacle forms a unit by which a set of clubs is pulled over a golf course. Tubular elements are used for connection to the golf club receptacle or bag from the three ends of which a handle and a pair of wheel supporting arms are pivotally mounted.

8 Claims, 9 Drawing Figures

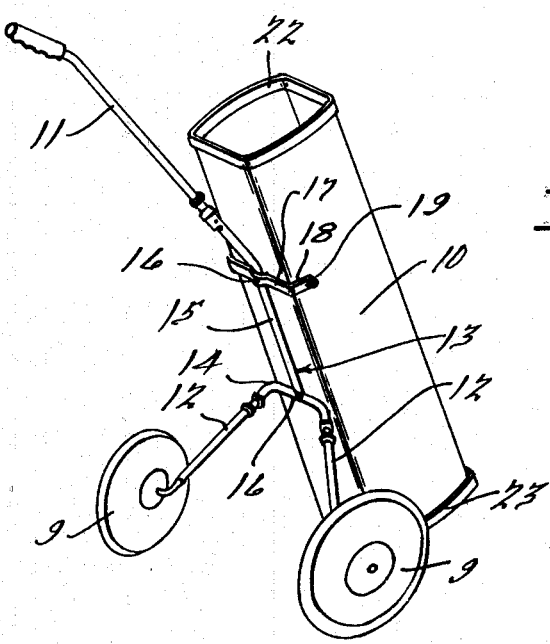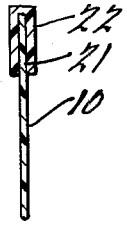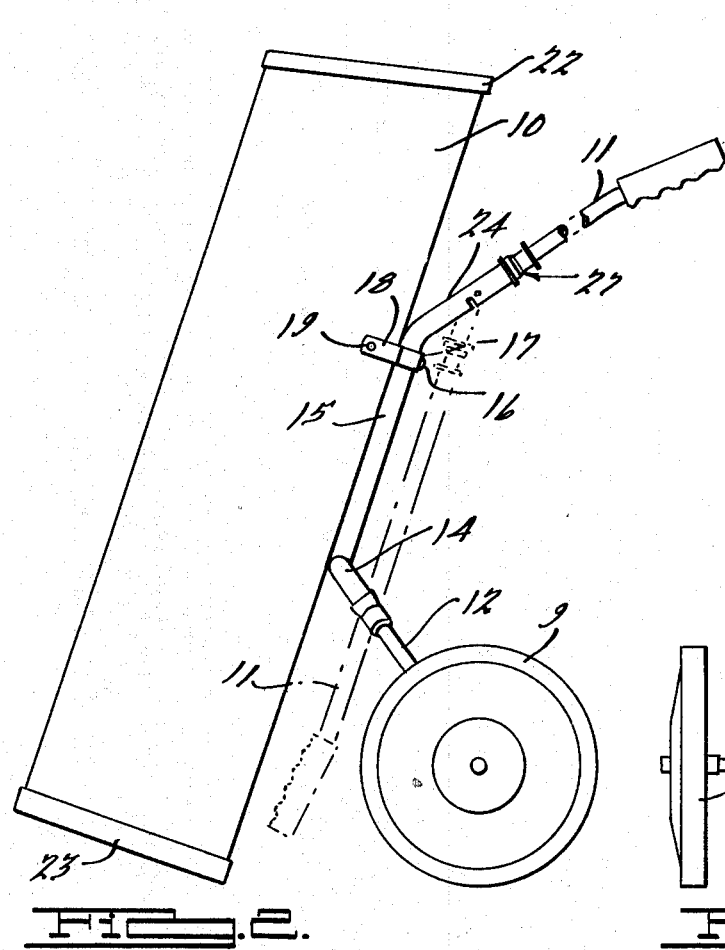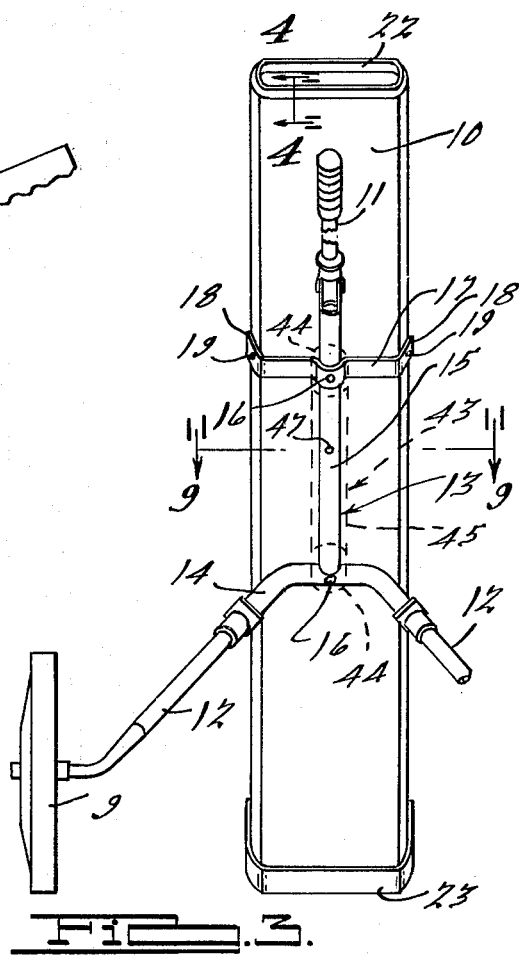

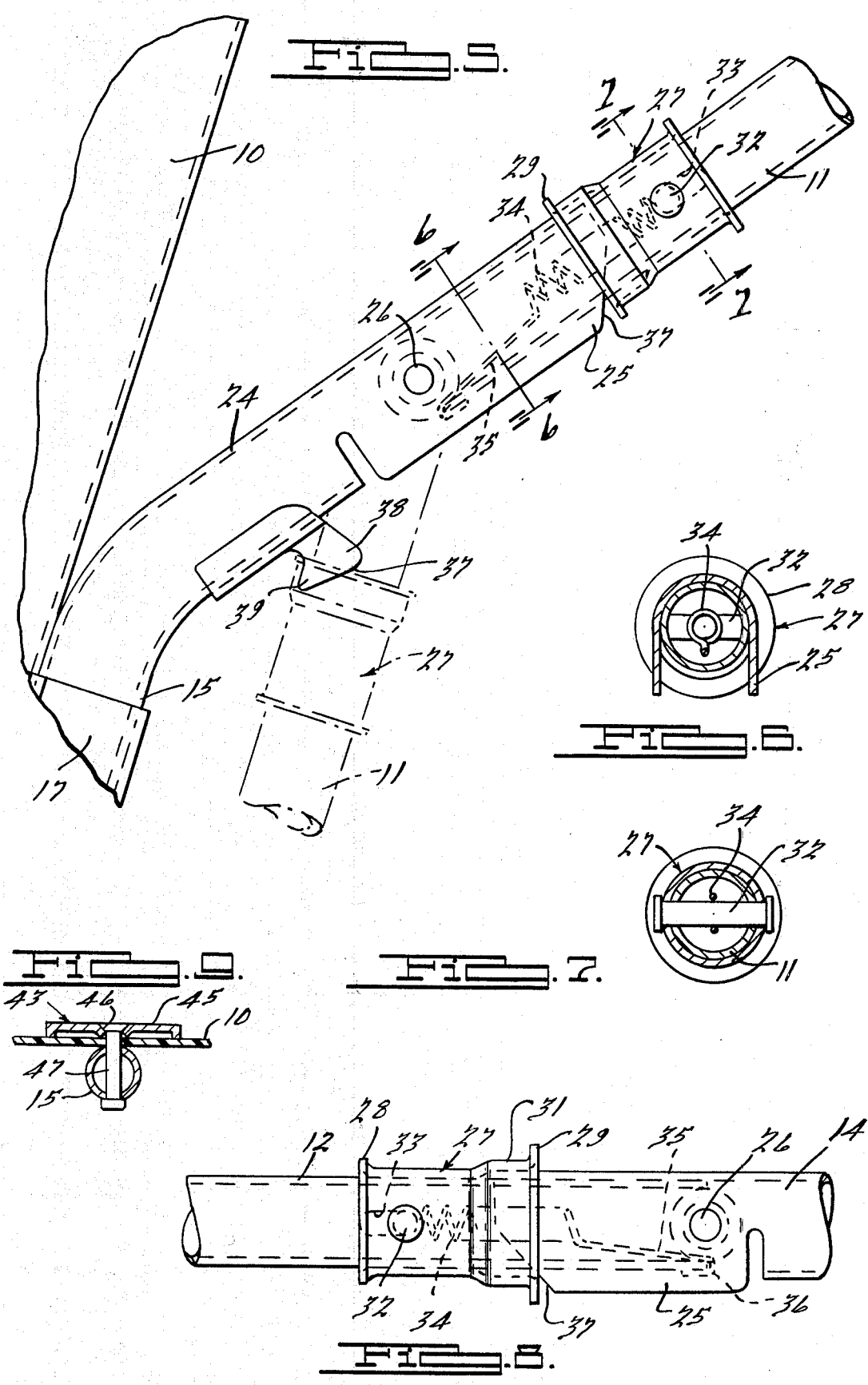

PULLABLE GOLF CLUB RECEPTACLE

BACKGROUND OF THE INVENTION

Reference may be had to the U.S. patents cited in application Ser. No. 871,530, filed Jan. 23, 1978 and those cited by the Examiner therein: U.S. Pat. Nos. 1,744,414; 1,899,825; 1,951,492; 2,073,114; 2,262,298; 2,458,924; 2,475,454; 2,518,803; 2,538,374; 2,629,609; 2,770,466; 2,783,054; 2,890,060; 3,014,732; 3,139,132; 3,142,087; 3,150,881; 3,425,708; 3,550,999; 3,559,709; 3,708,004; 3,735,997, and United Kingdom Pat. Nos. 722,429 and 824,697. These patents clearly show the state of the art of combination golf club carriers embodying an entirely different concept which includes pull means and a carrying handle for a golf club receptacle.

SUMMARY OF THE INVENTION

The invention pertains to a handle and wheel supporting arms which are made from the same diameter tubing with the ends of the handle and the wheel supporting arms having pivoted engagement with the ends of a supporting unit attached to a receptacle. The supporting unit is of tubular construction having a U-shaped portion which attaches to a golf bag and a portion welded thereto and extending centrally upwardly thereof. A handle and a pair of wheel supporting arms of like tubular construction are pivoted to the three ends of the support unit. The pivoted ends of the handle and arms have a tubular locking sleeve which automatically locks the handle and the wheel supporting arms in extension of the ends. The locking sleeves are locked by a spring which is further stressed when the sleeves are manipulated to release the handle and the wheel supporting arms to permit the wheels to collapse against the bag and the handle to be moved through substantially 180° to automatically lock on the tubular unit so that the bag can be lifted by the handle when the clubs are to be carried. The idea of using like tubular construction for the handle and arms and like tubular latching elements which slides thereon saves substantial cost for the dies as well as the assembled pullable receptacle.

BRIEF DESCRIPTION OF THE DRAWINGS

FIG. 1 is a view of a pullable receptacle for golf clubs illustrated in standing position;

FIG. 2 is a side view of the structure illustrated in FIG. 1, with the handle shown in pulling and dotted carrying positions;

FIG. 3 is a broken front view of the structure illustrated in FIGS. 1 and 2;

FIG. 4 is a broken sectional view of the structure illustrated in FIG. 3, taken on the line 4—4 thereof;

FIG. 5 is an enlarged view of the pivoted handle showing it in pulling and carrying latched positions;

FIG. 6 is a sectional view of the structure illustrated in FIG. 5, taken on the line 6—6 thereof;

FIG. 7 is a sectional view of the structure illustrated in FIG. 5, taken on the line 7—7 thereof;

FIG. 8 is a view of the pivoted wheel supporting arms with the latch automatically actuated to maintain the arms in fixed position, and FIG. 9 is a sectional view of the structure illustrated in FIG. 3, taken on the line 9—9 thereof.

DESCRIPTION OF THE PREFERRED EMBODIMENT

The receptacle or bag 10 of the present invention is similar to that illustrated, described and claimed in the above-mentioned application. The handle 11 and the wheel supporting arms 12 are of tubular construction being made from tubular stock having the same outside diameter. A receptacle attaching unit 13 is made of a U-shaped tubular element 14 and a straight element 15 which is welded to the tubular section 14 at the center thereof. Bolts or rivets 16 secure the unit 13 to the receptacle 10. A cross strap 17 may be welded to the upper part of the tubular section 15 if further support is needed for the unit 13 by securing the ends 18 of the strap 17 to the side edge of the receptacle by rivets or screws 19.

While the receptacle 10 may be made from a rolled up sheet of plastic, metal or like material, it is preferably molded from a die to provide a bottom and side walls, the latter along with the rolled up sheets having a thin top edge 21. A plastic molding unit or strap 22 is centrally split to receive the top edge 21 of the receptacle 10 when disposed in the split portion provided in the plastic unit. When made from sheet material, the bottom 23 has an outer vertical flange secured to the outer bottom edge of the rolled up sheet 10. Otherwise, the bottom 23 is molded when the side of the bag is molded in a die as a unit with the bottom.

The portion of the element 15 above the strap 17 is deflected outwardly at 24 at a substantially 30° angle to the bag. This provides an end 25 which is of U-shape and to which the handle 11 is secured by a pivot 26. This permits the handle 11 to be disposed in extension of the angular portion 24 or in an angular position thereto parallel to the bag 10, as illustrated in FIG. 5. Similarly, the wheel supporting arms 12 which form the legs for supporting the wheels 9 are likewise secured to the ends of the U-shaped tubular element 14 by pivots 26, as illustrated in FIG. 8, similar to that which secures the handle 11 on the extending angular portion 24 of the upstanding element 15. The ends 25 of the U-shaped element 14 are similarly formed as U-shaped sections for supporting the arms 12.

The ends of the handle 11 and the wheel supporting arms 12 are provided with like latching tubular elements 27 which have a flange 28 at one end and a flange 29 at the other end. The end portion 31 adjacent to the flange 29 is expanded in diameter to receive the upper portion of the adjacent end of the channel sections 25 to form the latch. The latching tubular element 27 has a rivet 32 extending therethrough and through opposite slots 33 in the ends of the wheel supporting arms 12 and the handle 11. One end of a spring 34 is secured to the rivet 32 with the opposite end 35 hooked over the end of the wheel supporting arms 12 and the handle 11, as illustrated in FIGS. 5 and 8.

When the tubular section 27 is moved along the ends of the tubular portions 11 and 12 to stretch the spring 34, the handle and wheel supporting arms are released so that the handle 11 may be pivoted to a position parallel to the bag 10 and the wheel supporting arms 12 pivoted to have the wheels move into engagement with the bottom of the bag, as shown in the above-mentioned patent application. In view of the provision of a sloping end 37 on the end of the tubular elements 14 and 15, the tubular element 27 is automatically actuated by the flange 29 to retract the locking sleeve 27 and permit the handle 11 and wheel supporting arms 12 to move into latched position automatically when the handle is moved upwardly and the wheel supporting arms are moved outwardly. The wheels and handle are released from locked position when the tubular elements 27 are manually moved from latched position permitting the wheels to be moved into engagement with the bottom of the bag as shown in the abovementioned application. The handle is moved substantially parallel to the forward face of the bag where it is latched by an element 38 which has an arcuate end portion 39 with which the latching tubular element 27 latches automatically when moved into carrying position. The bottom face of the latch 38 has an angular section 37 which automatically operates the latch element 27 outwardly along the handle until the spring moves it into latch position, as illustrated in FIG. 5.

FIG. 9 is a sectional view taken through the front face of the bag or receptacle 10 showing the use of reinforcing means 43 for the bag when secured to the tubular unit 13 as above setforth. The reinforceing means 43 is a flat elongated element 45 having arcuate end portions 44. The arcuate end portion 44 could form a circular reinforcing element in which the bolts or rivets 16 may extend to reinforce the area thereabout. As shown in FIG. 9, the elongated element 43 has the arcuate end portions 44 and a straight channel section 45 therebetween. The center and end sections 44 are flanged for forming a bolt head receiving opening 46 and a closure for the sections 44. A central bolt or stud 47 may be provided through the central stem portion 15 of the attaching unit. The inside of the bag 10 is smooth for preventing the roughing of the club handles when inserted and removed therefrom.

What is claimed is:

1. A supporting element for a handle and a pair of wheel supporting arms which includes a unit fixedly attachable to a golf club bag and providing three outwardly extending tubular members having generally U-shaped ends of substantially similar size, a handle, a pair of wheel supporting arms, and pivot means securing said handle and arms in pivoted relation to said ends for collapsing the wheels and handle, said handle and arms being of generally cylindrical tubular shape and of substantially the same diameter, and being adapted to be disposed within said U-shaped ends, said handle and arms having locking tubular sections thereon, movable so as to partially overlay said U-shaped ends.

2. A supporting element for a handle and arms as recited in claim 1, wherein extending sides of the U-shaped ends slope at an angle of substantially 45° to form a cam edge.

3. A supporting element for a handle and arms as recited in claim 1, wherein said locking tubular sections are of like shape.

4. A supporting element for a handle and arms as recited in claim 3, wherein rivets on said tubular sections pass through slots on opposite sides of said handle and arm ends.

5. A supporting element for a handle and arms as recited in claim 4, wherein a spring has one end secured to one of said rivets on said tubular section with the opposite end secured to the tubular end adjacent the handle or arm.

6. A supporting element for a handle and arms as recited in claim 5, wherein said tubular sections being of like construction latch said handle and arms automatically in extension of said tubular ends.

7. A supporting element for a handle and arms as recited in claim 6, wherein a second latch is engaged by said handle which secures the handle in substantially parallel relation to the bag in bag-carrying position.

8. A supporting element for a handle and wheel supporting arms as recited in claim 1, wherein reinforcing means is provided on the inner surface of the bag through which securing means extend to clamp the bag between said reinforcing means and said unit.

* * * * *